(No Model.) 4 Sheets—Sheet 1.

F. H. RICHARDS.
WEIGHING AND DELIVERING APPARATUS.

No. 600,040. Patented Mar. 1, 1898.

Witnesses:
O. W. Smith
J. L. Edwards Jr.

Inventor:
F. H. Richards (No Model.) 4 Sheets—Sheet 2.

F. H. RICHARDS.
WEIGHING AND DELIVERING APPARATUS.

No. 600,040. Patented Mar. 1, 1898.

Witnesses:
O. W. Smith
J. L. Edwards Jr.

Inventor:
F. H. Richards

(No Model.) 4 Sheets—Sheet 3.

F. H. RICHARDS.
WEIGHING AND DELIVERING APPARATUS.

No. 600,040. Patented Mar. 1, 1898.

Witnesses
O. W. Smith
J. L. Edwards Jr.

Inventor
F. H. Richards (No Model.) 4 Sheets—Sheet 4.

F. H. RICHARDS.
WEIGHING AND DELIVERING APPARATUS.

No. 600,040. Patented Mar. 1, 1898.

Witnesses:
D. S. Hawkins.
J. L. Edwards Jr.

Inventor:
F. H. Richards.

UNITED STATES PATENT OFFICE.

FRANCIS H. RICHARDS, OF HARTFORD, CONNECTICUT.

WEIGHING AND DELIVERING APPARATUS.

SPECIFICATION forming part of Letters Patent No. 600,040, dated March 1, 1898.

Application filed August 10, 1897. Serial No. 647,742. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing and Delivering Apparatus, of which the following is a specification.

This invention relates to weighing and delivering apparatus, and in certain respects it is an improvement upon the machine covered by my contemporaneously-pending application, Serial No. 640,854, filed June 15, 1897.

One of the objects of the invention is to provide an improved apparatus of the character specified comprehending, preferably, weighing mechanism embodying a load-receiver mounted for traveling movement, means for supplying the load-receiver with material, and means for effecting the discharge of the load-receiver when it reaches a predetermined point; and in the form of the invention illustrated I have represented, for the purpose of securing a great amount of work in a given time, a plurality of weighing mechanisms supported for traveling movement in an orbital path, said mechanisms being preferably automatically dischargeable at a common point.

For the purpose of insuring greater accuracy the respective weighing mechanisms are preferably overloaded—that is, each is supplied with a quantity of material in excess of the predetermined load, the surplus being removed prior to the discharge of said load and while the weighing mechanism is in transit, and the several operations of the series of weighing mechanisms are electrically governed, so as absolutely to assure the sequential or regular action of the different parts of the apparatus.

My improved apparatus comprehends, preferably, the provision of weighing mechanism embodying a load-discharging member, a carrier for moving the weighing mechanism through a predetermined path, an electric conducting-track, an electric circuit having a source of energy, means for causing the operation of the load-discharging member located in said circuit, a contact device in the circuit contiguous to said track, and a circuit controller or maker operative with the weighing mechanism.

In the form of the invention represented the closer of the load-receiver constitutes the load-discharging member of the weighing mechanism, it being preferably supported for movement in reverse directions and adapted when moved in one direction to permit the surplus to pass from the load-receiver and when moved in the opposite direction at a succeeding stage to permit the predetermined load to pass from said load-receiver. The closer is preferably actuated to accomplish the results specified by the successive energization of a pair of solenoids conveniently mounted upon the load-receiver.

In the drawings accompanying and forming part of this specification.

Similar characters designate like parts in all the figures of the drawings.

My improved apparatus comprehends a plurality of weighing mechanisms—such as W, W', $W^2$, $W^3$, $W^4$, and $W^5$—each consisting of a load-receiver and a supporting scale-beam therefor, as will hereinafter appear. It is apparent, however, that other kinds of automatic weighing mechanisms than those represented may be employed.

The several weighing mechanisms are mounted for traveling movement upon the carrier C, which consists in the present case of a rotary table preferably continuously driven by suitable mechanism, as will hereafter appear. The carrier or table C embodies a disk or central portion 2, an annular rim 3, connected with the disk by a series of bent arms 4, extending radially from the disk 2, a hub or sleeve 5, and a series of arms 6, joining the hub and rim 3, the hub 5 being apertured and driven over the reduced portion 7 of the longitudinal sleeve 8 of the discharge-hopper D, hereinafter more specifically described. The longitudinal sleeve 8 surrounds and is rotative upon the vertical mast or post 9, the lower end of which is stepped in the bearing portion or hub 10 of the base or bed 12, the hub having the series of radial arms, as 13, which are adapted to rest upon the floor or other foundation. The lower reduced end of the discharge-hopper D, which is funnel-shaped, bears against and turns upon the hub 10 and the shoulder 14 of the post 9. (See Fig. 1.) The reduced lower end 15 of the discharge-hopper D has secured thereto the worm-gear 16, with which the worm 17 on the shaft 18 meshes, said shaft being carried by the support or bracket 19 on one of the arms 13 of the base. The shaft 18 carries the driver 20, in the form of a pulley, which can be operated in some convenient manner. It will be evident that on the rotation of the pulley 20 the shaft 18, the worm 17, worm-gear 16, and hopper D will be also rotated, and that the turn-table C by reason of its connection with the discharge-hopper will be moved through an orbital path to effect the automatic operation of the several weighing mechanisms supported upon said turn-table. It is apparent, however, that other means may be employed than those illustrated and described for operating the carrier or table C.

The carrier or table C is represented as supporting for movement through an orbital path a series of six weighing mechanisms, though this number may be varied or even one might be employed without departing from the scope of the invention. The series of weighing mechanisms being similar in construction it is deemed necessary to describe but one of them in detail, corresponding parts in the other mechanisms being designated by similar characters.

The weighing mechanism W (shown at the left in Fig. 1) consists of a load-receiver G and a supporting scale-beam B, the scale-beam being substantially similar in construction and mounting to those described in Letters Patent No. 548,840, granted to me October 29, 1895, to which reference may be had. The scale-beam B is supported upon adjacent branches of the bifurcated arms 25 and 26, extending outward from the rim 3 of the carrier C, the load-receiver being suspended at the poising end of the beam substantially as in said patent. The load-receiver G has in its lower end the usual discharge-outlet, which is covered by the closer or flap L, pivoted, as at 27, to the load-receiver G, the axis of oscillation of the closer being on a vertical line intersecting the center of the load-receiver, whereby the closer has in itself no tendency to swing in either direction when shut, and means being preferably employed positively to cause the operation of said closer, as will hereinafter appear.

Figures 1, 6:
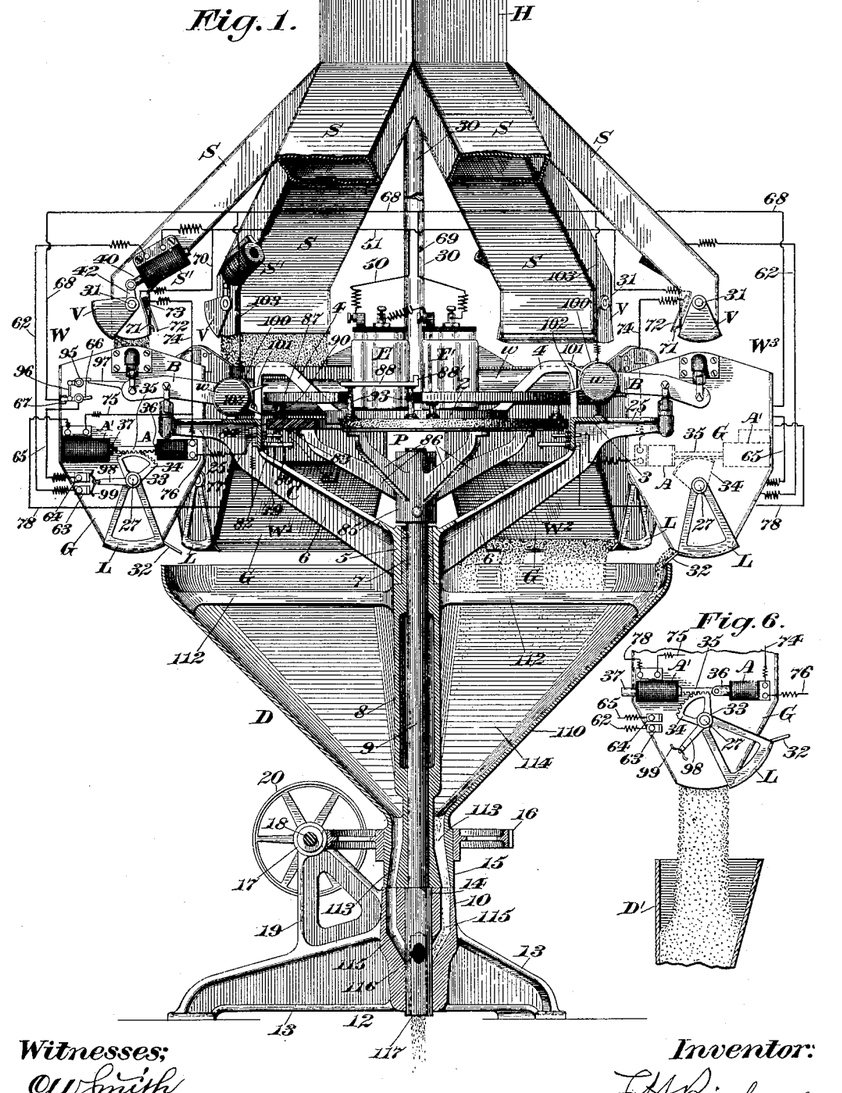
Figure 1 is a sectional front elevation of my improved weighing and delivering apparatus, the section being taken in the line $z\ z$, Fig. 2.
Fig. 6 is a detail view showing a portion of a load-receiver and its closer open and the discharge-conduit below the same into which the predetermined loads are emptied.
Figures 3, 4, 5, 8, 9, 10, 11:
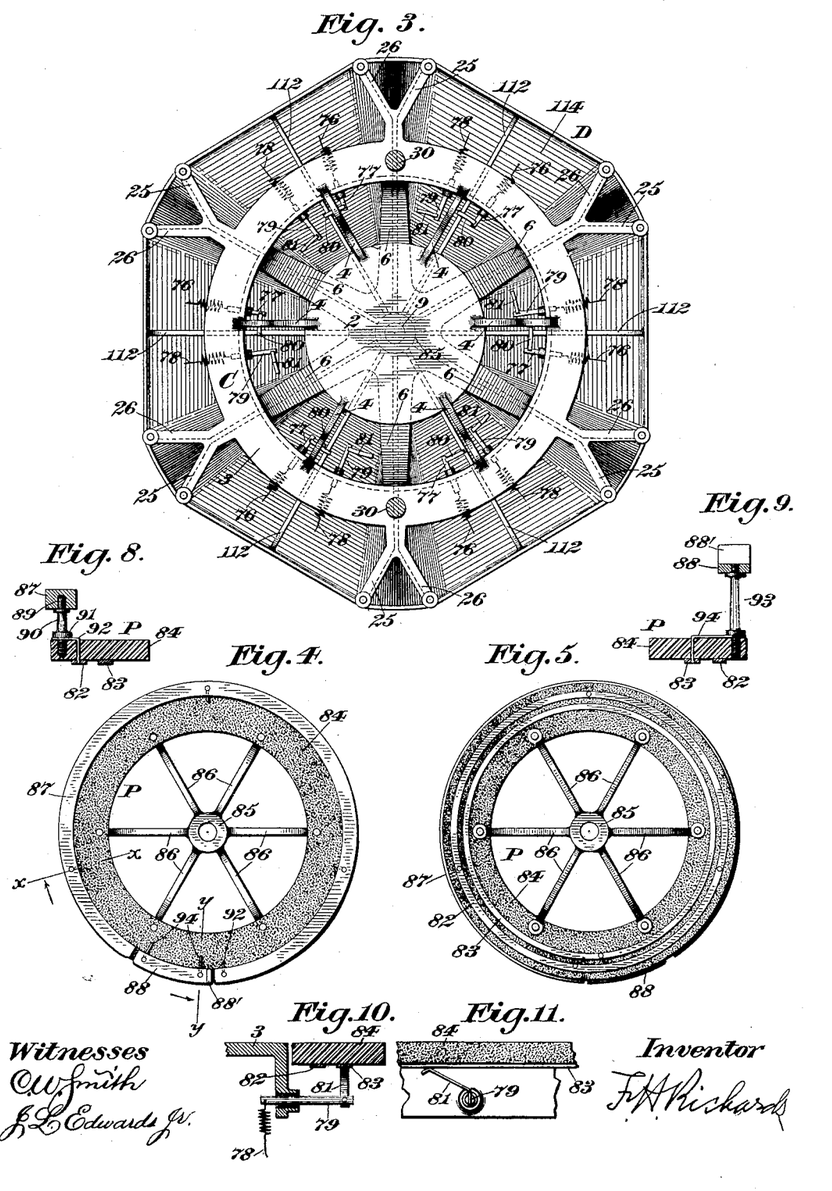
Fig. 3 is a plan view of a turn-table upon which the several weighing mechanisms are mounted.
Fig. 4 is a plan view of a platform to which certain of the electric conductors are secured.
Fig. 5 is a bottom view of the same.
Figs. 8 and 9 are cross-sections on the lines $x\ x$ and $y\ y$, respectively, viewed in the directions of the arrows, Fig. 4.
Figs. 10 and 11 are detail views hereinafter more particularly described.
Figure 7:
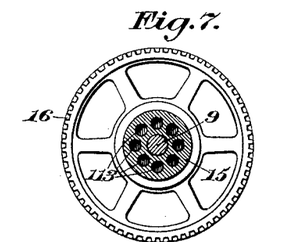
Fig. 7 is a detail in plan of one of the gears for rotating the turn-table, the support for the gear being shown in cross-section.

The several load-receivers are overloaded—that is, each is supplied with a mass of material containing the predetermined load and an excess, the excess being preferably removed while said weighing mechanisms are in transit. For overloading the series of load-receivers G, I have illustrated a plurality of inclined spouts, as S, extending from the relatively large supply-hopper H, to which the columns 30 are secured, said columns rising from the rim portion 3 of the carrier C, as shown in Figs. 1 and 3. The discharge of the supply-stream from the several spouts S is controlled, preferably, by the valves V, one for each spout, pivoted, as at 31, near the lower ends of said spouts.

The closer L, which constitutes the discharging member of the weighing mechanism, is supported for oscillation in reverse directions, it being adapted, when swung in one direction, as indicated by the weighing mechanisms $W^2$ and $W^3$ in Fig. 1, to permit the surplus to pass from the load-receiver and to fall or be directed by the guide lip or extension 32 on the closer into the funnel-shaped discharge-hopper D. When the closer is swung in the opposite direction, as represented in Fig. 6, the predetermined load can be emptied into a discharge hopper or trough D', which can be secured to the base 12 in some convenient manner or into some other vessel. For thus successively actuating the closer L to swing the same in opposite directions I prefer to employ a plurality of solenoids, such as A and A', which are alternately or successively energized and which act through interposed mechanism, such as gearing, positively to operate the closer at predetermined stages in the travel about its circuit. The hub 33 of the closer L has secured thereto the segment 34, meshing with the rack 35, pivoted at its opposite ends to the cores 36 and 37, respectively, of the solenoids A and A', for a purpose that will hereinafter appear.

The spout S in connection with the valve V constitutes a convenient means for overloading the load-receiver G of the weighing mechanism W, the other weighing mechanisms being similarly overloaded in the manner hereinbefore set forth. The valve V is preferably a "gravity-valve," and is held in its normal or wide-open position preferably by a solenoid, as S'. The core 40 of the solenoid is pivoted to the crank-arm 42 of the valve V.

In Fig. 1 the solenoid S' is represented as energized, whereby the core 40 is held in its retracted or primary position, so that by reason of its connection with the valve the latter is maintained in its wide-open position to permit the full volume of the supply from the spout or conduit S to drop into the load-receiver. On the deënergization of the solenoid S' the valve V is released and shuts by its own weight to cut off the supply from the spout S.

The order of operation of each weighing mechanism is as follows: overloading, load-reducing, and load-discharging, and these operations succeed one another, being automatically and electrically caused during the travel of the several weighing mechanisms about their path.

The source of energy for operating the several solenoids may be of any suitable character. It is represented herein consisting of one or more batteries E and E' of ordinary construction, supported on the disk portion 2 of the rotary carrier C. (See Figs. 1 and 2.) The electrical connections between the several weighing mechanisms and the two batteries E and E' being the same, it is deemed necessary to describe but one system in detail, corresponding parts of the other (see mechanism W³, Fig. 1) being denoted by similar characters. The wire 50 leads from the battery E to the wire 51, connected at its end with the solenoid S', from which the wire 62 extends, attached at its opposite end to the contact-piece 63, attached to the load-receiver. A similar and adjacent contact-piece is shown at 64, also fixed to the load-receiver and from which the wire 65 extends, the opposite end of said wire being secured to the circuit-controller or circuit making and breaking lever 66, pivoted to the load-receiver, the working end of said lever 66 being normally against the contact-piece 67 on the load-receiver. The wire 68 is connected, respectively, with the contact-piece 67 and to the wire 69, connected with the battery E'. The wire 51, near its point of junction with the solenoid S', is intersected by the wire 70, connected at its opposite end to the spring contact-arm 71, coöperative with the contact-point 72, these parts being secured to the insulating-strip 73 near the lower end of the spout. The wire 74 is connected with the contact-arm 72 and also with the solenoid A. The wire 75 runs from the wire 74 to the solenoid A'. The wire 76 leads from the solenoid A to the bar 77, passing through an aperture in and insulated from the rim portion 3 of the carrier C. The wire 78 connects the solenoid A' with a similarly-mounted bar 79. The bars 77 and 79 carry at the outer ends thereof the trailers or spring contact-arms 80 and 81, contiguous to the tracks 82 and 83, respectively, secured to the under side of the rim portion 84 of the stationary platform P. The tracks or ways 82 and 83 serve as conductors and are annular or circular in shape for a purpose that will hereinafter appear, they being secured in some suitable manner to the part 84, constructed of non-conducting material.

The platform P consists of a hub 85, the rim portion 84, to which I have just referred, and a series of radial arms 86, connecting said parts, the hub or sleeve 85 being secured near the upper end of the mast or post 9.

A series of arc-shaped or curved conductors, as 87 and 88, located, preferably, in different horizontal planes, are mounted upon the upper side of the annular portion 84 of the platform P and are electrically connected or in circuit with the circular tracks 82 and 83, respectively, along which the spring-trailers 80 and 81 travel. The conductor 87 has a series of sockets, as 89, located at suitable intervals to receive the posts 90, the opposite ends of which are in threaded engagement with the part 84, (see Fig. 8,) the shoulder 91 of said post fitting against the wire 92, connected with the track 82. The conductor 88 is supported by posts, as 93, in a substantially similar manner, threaded into the part 84, and the shouldered post fitting against the wire 94, connected with the track 83. (See Fig. 9.) The actuator for the circuit-controller 66 is illustrated at 95, pivoted near the upper end of the load-receiver and connected with said circuit-controller by the link 96, pivoted to said parts, the actuator 95 being operated by the projecting finger 97 on the beam B, which oscillates between the free arms of the parts 95 and 66. (See Fig. 1.)

The hub 33 of the closer L has the laterally-projecting arm 98, having at its free end the spring circuit-controller or circuit making and breaking device 99. The conductor 88 has the upturned flange 88', the purpose of which will hereinafter appear.

The weighing mechanism or the beam B thereof is furnished with a circuit-controller, such as 100, secured to the beam-weight w and having the projecting prongs or circuit-closers 101 and 102 adapted to make contact with the outer alined faces or peripheries of the conductors 87 and 88, respectively. The circuit-controller 100 is connected with the wire 68 by the wire 103.

Figure 2:
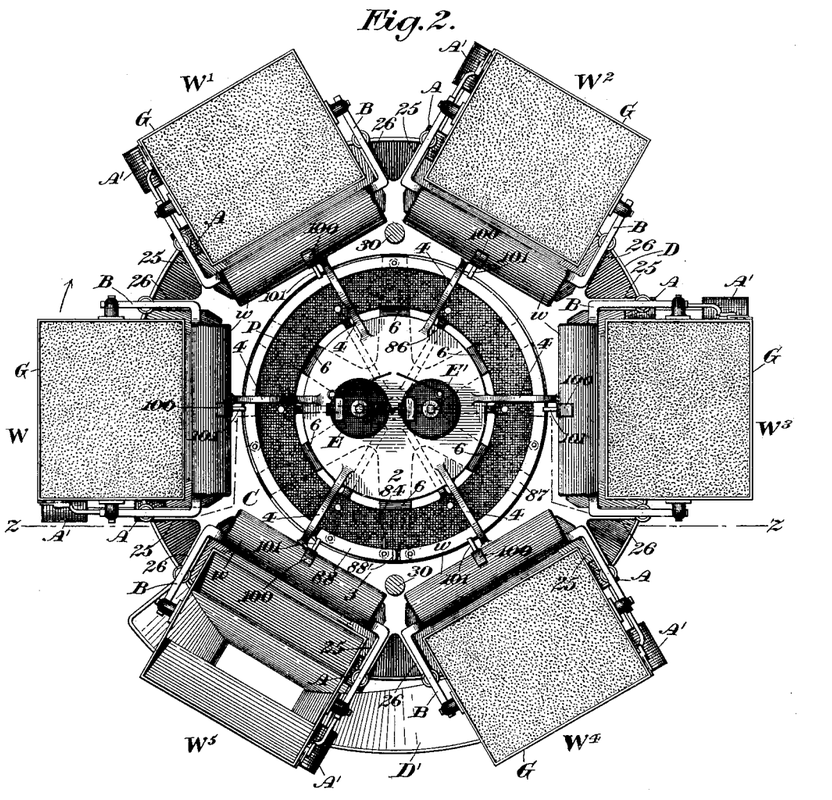
Fig. 2 is a plan view of the same with the delivery apparatus removed.
Figure 13:
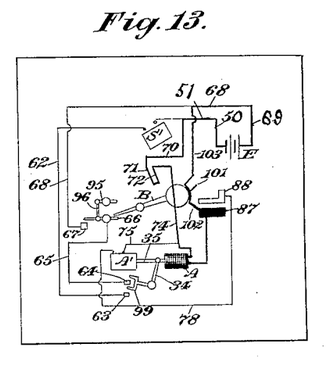
Figure 14:
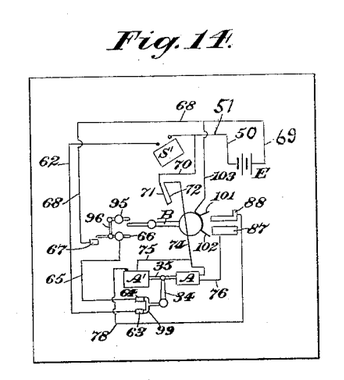

In Fig. 1 the weighing mechanism W is in the position in which its receiver G is overloaded, and it is assumed that the carrier C is being rotated in the direction of the arrow in Fig. 2 through the hereinbefore-described mechanism. The closer L is shut and the valve V is open by reason of the energization of the solenoid S', the circuit being established through the batteries E, wires 69 and 68, contact-piece 67, circuit-controller 66, wire 65, contact-pieces 64 and 63, wire 62, solenoid S', and wires 51 and 50, as indicated by the heavy lines in Fig. 12. The valve V being held open by the solenoid the full volume of the supply-stream can enter the load-receiver G, and when a certain proportion of the load has been received said receiver and the poising end of the beam B will descend until the beam-finger 97 strikes the free arm of the circuit-controller 66, so that the working end of said controller is moved away from the contact-piece 67, at which time the load-receiver is overloaded, so that the solenoid-circuit is broken and the solenoid deënergized. When the solenoid is deënergized, the valve V is released and can shut by its own weight. It will be understood that during this period of operation the weighing mechanism W will have traveled for a portion of the distance about its circuit or until it reaches a position occupied approximately by the weighing mechanisms W² and W³, Figs. 1 and 2. When the beam reaches the end of its stroke on the overloading of the receiver G and the shutting of the valve V in the manner just described, the prong or projection 102, extending rearward from the beam-weight $w$, will be contiguous to the entering end of the periphery of the conductor 87, as represented by the weighing mechanism W², Fig. 1. When the projection 101 makes contact with the inner face of the conductor 87, a closer-operating circuit is established as follows: from the wires 50 and 51, wire 70, spring-contact arms 71 and 72, (held against each other by the valve V,) wire 74, solenoid A, wire 76, bar 77, spring-trailers 80, track 82, post 90, conductor 87, projection 102 of the circuit-controller 100, wire 103, wire 68, wire 69, and batteries E and E', so that the solenoid A is energized, as indicated by the weighing mechanism W³, Fig. 1, and by heavy lines in Fig. 13, so that the core of said solenoid is retracted and the rack 35 and segment-gearing 34 are operated to swing the closer L outward, as indicated by the weighing mechanisms W² and W³, Fig. 1, whereby the surplus can pass into the discharge-hopper D, which serves as a surplus-receiver. So long as the projection 102 remains in contact with the periphery of the conductor 87 the solenoid A will be energized to hold the closer L open to permit the surplus to pass from the load-receiver. It will be evident that as the material is removed from the overloaded receiver G the weight $w$ will drop, so that the projection 102 can pass out of contact with the conductor 87, it being apparent that at this time the surplus is entirely removed, whereby the circuit in which the solenoid A is located is broken, so that said solenoid is deënergized. When said solenoid is deënergized, the closer L is released and instantly shuts by its own weight to stop the further withdrawal of material from the load-receiver. When the projection or prong 102 passes out of contact with the conductor 87, all of the circuits will be broken, as indicated by the light lines in Fig. 14, at which time the receiver G contains the predetermined charge.

Figure 15:
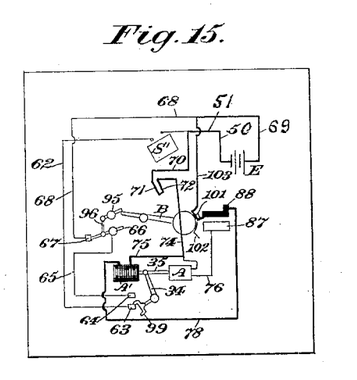

The flange 88' of the conductor 88 is disposed in the path of movement of the prong 101, so that when these two parts come in contact a third circuit will be established to energize the solenoid A' for swinging the closer L to its wide-open position, as indicated in Fig. 6, thereby to permit the completed or predetermined load to pass into the discharge-conduit D'. The circuit is completed through the following parts, as indicated by the heavy lines in Fig. 15, viz: wires 50 and 51, wire 70, contact-arms 71 and 72, wire 74, wire 75, solenoid A', wire 78, bar 79, spring-trailer or contact-arm 81, track 83, wire 94, post 93, conductor 88, prong 101 of the circuit-controller, wire 103, wire 68, wire 69, and batteries E and E'. When the circuit is established through the parts enumerated, the solenoid A' is energized, thereby retracting its core 37 and moving the rack 35 in a corresponding direction, so that the closer L can be swung open, as indicated in Fig. 6, to discharge the load from the load-receiver. When the closer opens to discharge its contents, the weight $w$ will of course drop, the prong 101 passing out of contact with the flange 88', but will remain in contact with the body or main portion of the conductor 88, so that as the weighing mechanism moves in its circuit the closer L can be positively held open for a comparatively long period of time, so as to insure the complete emptying of the load-receiver. When the projection 101 passes out of contact with the conductor 88, the circuit in which the closer-opening solenoid A' is located will be broken, so that the closer L can shut to again repeat the weighing operation.

I have hereinbefore described circuit making and breaking devices operative, respectively, with the valve V and closer L, and it will be apparent that when either one of these members is open the actuating-solenoid for the other cannot be energized.

Figure 12:
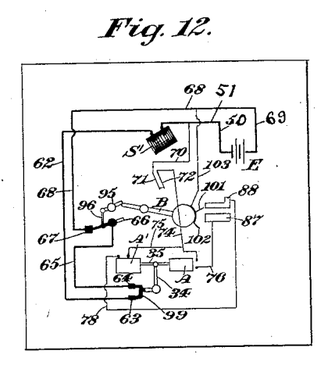
Figs. 12, 13, 14, and 15 are diagrammatic views illustrating the manner of making and breaking the different circuits.

When the weight $w$ drops on the discharge of the load into the hopper D', the finger or projection 97 thereon is raised and strikes the free arm of the actuating-lever 95, so that the circuit-controller 66 is raised into contact with the contact-piece 67 on the load-receiver, so that when the closer L shuts the circuit in which the solenoid S' is located can be established to energize said solenoid, thereby retracting its core 40 and swinging the valve V open, as indicated, respectively, in Figs. 1 and 12.

The surplus from the several weighing mechanisms passes inwardly into the substantially conical portion 110 of the discharge-hopper D, which is joined by the series of ribs 112 to the longitudinal sleeve 8, the material gravitating down the inclined wall of the hopper, as shown in Fig. 1. The reduced or lower portion 15 of the discharge-hopper D has a series of openings 113, extending longitudinally through the same and communicating with the main chamber 114 of said hopper and through which the surplus that gravitates down the inclined wall of the conical portion 110 of the hopper passes, the material when it emerges from the openings or channels 113 entering the corresponding series of channels or openings 115, formed in the central portion or hub 10 of the base 12, the several openings 113 and 115 being brought into registration or alinement as the hopper D rotates during the operation of the apparatus. The material passes from the channels or openings 115 through the series of slots or holes 116, formed near the lower end of the mast 9 and communicating with the chamber or socket 117 in the foot of said mast. When the material drops, it can be disposed of in the usual manner.

I have described in detail and at length the operation of the weighing mechanism W, which, with its several parts, is shown in detail in several of the views, and as the series of weighing mechanisms are similar it has been deemed unnecessary to illustrate the different parts and their operation. The order of operation in each weighing mechanism is the same—that is, overloading, load-reducing, and load-discharging.

Having described my invention, I claim—

1. The combination, with weighing mechanism embodying a load-discharger, of a carrier on which the load-receiver is mounted; means for imparting a traveling movement to the carrier; an electrical circuit; means for supplying an overload to the weighing mechanism; means located in said circuit for causing the operation of said load-discharger to effect the removal of the surplus; an automatically-operative circuit-controller adapted to close the circuit in which said last-mentioned means is located and while the carrier is in motion; and successively-effective means for causing the discharge of the predetermined load.

2. The combination, with weighing mechanism including a load-discharger, of a rotative carrier on which the load-receiver is mounted and operable for moving the same through a predetermined path; continuously-operative mechanism for rotating said carrier; an electric circuit; means for supplying an overload to the weighing mechanism; means located in said circuit for causing the operation of said load-discharger to effect the removal of the surplus; an automatically-operative circuit-controller governed by the movement of the weighing mechanism and adapted to close the circuit in which said last-mentioned means is located when the weighing mechanism is at a predetermined point; and successively-effective means for causing the discharge of the predetermined load.

3. The combination, with weighing mechanism involving a load-discharger, of a rotative carrier on which the weighing mechanism is mounted; means for operating the carrier; an electric circuit mounted on the carrier; means for supplying an overload to the weighing mechanism; means located in the circuit for causing the operation of the load-discharger; an automatically-operative circuit-controller governed by the motion of the weighing mechanism and adapted to close the circuit at a predetermined point to effect the removal of the surplus from weighing mechanism; and successively-effective means for causing the discharge of the predetermined load.

4. The combination, with weighing mechanism including a load-discharger, of a rotative carrier including a disk and a rim portion connected by a series of arms, the weighing mechanism being supported upon said rim portion; an electric circuit having battery or batteries mounted on said disk; means for supplying an overload to the weighing mechanism; means located in said circuit for causing the operation of the load-discharger; an automatically-operative circuit-controller adapted to close the circuit and thereby effect the removal of the surplus; and successively-effective means for causing the discharge of the predetermined load.

5. The combination of weighing mechanism embodying a load-discharger; a carrier for moving the weighing mechanism through a predetermined path; an electric conducting-track; an electric circuit; means located in the circuit for causing the operation of the load-discharger; a contact device operative with the weighing mechanism and contiguous to said track; and a circuit-maker operative with the weighing mechanism.

6. The combination of weighing mechanism embodying a load-discharger; a carrier for moving the weighing mechanism through a predetermined path; an electric conducting-track; an electric circuit; means located in the circuit for causing the operation of the load-discharger; a traveling contact device operative with the weighing mechanism and contiguous to said track; and a circuit-maker operative with the weighing mechanism.

7. The combination of weighing mechanism embodying a load-discharger; a carrier for moving the weighing mechanism through a predetermined path; an electric conducting-track; an electric circuit; means located in said circuit for causing the operation of the load-discharger; a contact device operative with the weighing mechanism and supported by the carrier and contiguous to said track; and a circuit-maker operative with the weighing mechanism.

8. The combination of weighing mechanism embodying a load-discharger; a rotary carrier for moving the weighing mechanism through a predetermined path; an annular electric conducting-track; an electric circuit; means located in said circuit for causing the operation of the load-discharger; a contact device contiguous to said track and operative with the weighing mechanism; and a circuit-maker also operative with the weighing mechanism.

9. The combination of weighing mechanism embodying a load-discharger; a rotary carrier for moving the weighing mechanism through a predetermined path; an electric conducting-track; a stationary platform to which said track is secured; an electric circuit; means located in said circuit for causing the operation of the load-discharger; a contact device supported by the carrier and contiguous to the track; and a circuit-maker operative with the weighing mechanism.

10. The combination of weighing mechanism embodying a load-discharger; a rotary carrier for moving the weighing mechanism through a predetermined path; an electric conducting-track; a platform to which said track is secured; an electric circuit; means located in said circuit for causing the operation of the load-discharger; a spring-contact device supported by the carrier and contiguous to said track; and a circuit-maker operative with the weighing mechanism.

11. The combination of weighing mechanism embodying a load-discharger; a carrier for moving the weighing mechanism through a predetermined path; an electric conducting-track; a platform to which said track is secured; an electric circuit; means located in the circuit for causing the operation of the load-discharger; a contact device; a bar on the carrier, to which said contact device is secured, said bar being located in the circuit; and a circuit-maker operative with the weighing mechanism.

12. The combination of weighing mechanism embodying a load-discharger; a carrier for moving the weighing mechanism through a predetermined path; an electric conducting-track; a platform to which said track is secured; an electric circuit; a bar supported by the carrier and in said circuit, said bar having a contact device contiguous to the track; a circuit-maker operative with the weighing mechanism; and means for rotating the carrier.

13. The combination of weighing mechanism embodying a load-discharger; a rotary carrier embodying a disk and a rim, said rim serving to support the weighing mechanism; a stationary track situated between the disk and rim portion of the carrier and having an electric conducting-track; an electric circuit; a contact device on the carrier contiguous to said track; and means for closing the circuit.

14. The combination of weighing mechanism embodying a load-discharger; a rotary carrier for moving the weighing mechanism through a predetermined path; a supply-spout rotative with the weighing mechanism; means for controlling the passage of material from the supply-spout; and electrically-operated means for actuating the load-discharger at a predetermined point in the rotation of the weighing mechanism.

15. The combination of weighing mechanism embodying a load-discharger; a rotary carrier for moving the weighing mechanism through a predetermined path; a stationary platform; a mast for supporting the same; an electric conductor on the platform; and electrically-operated means for actuating the load-discharger, said conductor being located in, and forming a part of, the electric circuit.

16. The combination of weighing mechanism embodying a load-discharger; a movable carrier on which the weighing mechanism is supported; a stationary platform; a mast for supporting the platform; a discharge-conduit carried by and rotative with the mast; and electrically-operated means for actuating the load-discharger, in circuit with the source of electrical energy and platform, respectively, and movable with the carrier.

17. The combination of weighing mechanism embodying a load-discharger; a movable carrier on which the weighing mechanism is supported; a stationary platform; a mast for supporting the platform; a discharge-conduit surrounding the mast and rotative thereon; and electrically-operated means for actuating said load-discharger, in circuit with the source of electrical energy and platform, respectively, and movable with the carrier.

18. The combination of weighing mechanism embodying a load-discharger; a movable carrier on which the weighing mechanism is supported; a stationary platform; a mast for supporting the platform; a discharge-conduit having a longitudinal sleeve surrounding the mast, said sleeve being reduced at one end and connected with the carrier; means for rotating the discharge-conduit; and electrically-operated means for actuating the load-discharger, in circuit with the source of electrical energy and platform, respectively, and movable with the carrier.

19. The combination of weighing mechanism embodying a load-discharger; a movable carrier on which the weighing mechanism is supported; a stationary platform; a mast for supporting the platform; a discharge-conduit carried by and rotative with the mast; and electrically-operated means for actuating said load-discharger, in circuit with the source of electrical energy and platform, respectively, and carried by the weighing mechanism.

20. The combination of weighing mechanism embodying a load-discharger; a movable carrier on which the weighing mechanism is supported; a mast; a stationary platform embodying a hub secured to the mast; and electrically-operated means for actuating said load-discharger, in circuit with the source of electrical energy and platform, respectively, and rotative with the carrier.

21. The combination of weighing mechanism embodying a load-discharger; a rotary carrier on which the weighing mechanism is supported; a mast; a stationary platform embodying a hub secured to the mast; a hopper secured to the carrier; means for rotating the hopper; electrically-operated means for actuating said load-discharger, in circuit with the source of electrical energy and platform, and rotative with the carrier.

22. The combination of weighing mechanism embodying a load-discharger; a movable carrier on which the weighing mechanism is supported; a stationary platform having a plurality of tracks; and means for operating the load-discharger, said means being in circuit with the tracks and source of electrical energy, respectively.

23. The combination of weighing mechanism embodying a load-discharger; a movable carrier on which the weighing mechanism is supported; a platform having a track; a conductor on the platform, connected with the track; means for operating the load-discharger, in circuit with the track; and a source of electrical energy connected, respectively, with the conductor and the means for operating the load-discharger.

24. The combination of weighing mechanism embodying a load-discharger; a rotary carrier on which the same is mounted; a platform having a track; means for operating the load-discharger; and a source of electrical energy in circuit, respectively, with the track and the means for operating the load-discharger.

25. The combination of weighing mechanism embodying a load-discharger; means for operating the same; a rotary carrier on which the weighing mechanism is mounted; a stationary platform having a track; a conductor connected with the track; and a source of electrical energy in circuit with the track and load-discharger-operating means, respectively.

26. The combination of weighing mechanism embodying a load-discharger; means for operating said load-discharger; a rotary carrier on which the weighing mechanism is mounted; a platform having a track; a conductor; a post engaging the platform and conductor, respectively, and connected by a wire with the track; and a source of electric energy in circuit with the track and load-discharger-operating means, respectively.

27. The combination of weighing mechanism embodying a load-discharger; means for operating the same; a carrier on which the weighing mechanism is mounted; a platform having a plurality of conductors; and a source of electric energy in circuit with the conductors and load-discharger-operating means, respectively.

28. The combination of weighing mechanism embodying a load-discharger; means for operating the same; a rotary carrier on which the weighing mechanism is mounted; a platform having a plurality of conductors located in different planes; and a source of electrical energy in circuit with the conductors and the load-discharger-operating means, respectively.

29. The combination of weighing mechanism embodying a load-discharger; means for operating the same; a rotary carrier on which the weighing mechanism is mounted; a platform having a plurality of conductors one of which is flanged; and a source of electric energy in circuit with the conductors and load-discharger-operating means, respectively.

30. The combination of weighing mechanism embodying a load-discharger; means for operating the same: a rotary carrier on which the weighing mechanism is mounted; a stationary platform having a plurality of conductors disposed in different horizontal planes; and a source of electric energy in circuit with the conductors and load-discharger-operating means, respectively.

31. The combination of weighing mechanism embodying a load-discharger; a carrier for moving the weighing mechanism through a predetermined path; an electric track; an electric circuit; means for causing the operation of the load-discharger and located in said circuit; a traveling contact device in the circuit, contiguous to the said track; and a circuit-maker operative with the weighing mechanism.

32. The combination of weighing mechanism embodying a load-discharging member; a carrier for moving the weighing mechanism through a predetermined path; electric conducting-tracks; an electric circuit; means for successively causing the operation of the load-discharging member at different stages and located in said circuit; a series of traveling contact devices in the circuit, contiguous, respectively, to said tracks; and circuit-making means operative with the weighing mechanism.

33. The combination of weighing mechanism embodying a load-receiver having a closer and a scale-beam; a carrier for moving the weighing mechanism through a predetermined path; an electric conducting-track; an electric circuit; means for causing the operation of the closer and located in said circuit; a traveling contact device in the circuit, contiguous to the track; and a circuit-maker on the scale-beam.

34. The combination of weighing mechanism embodying a load-receiver and a scale-beam; a carrier for moving the weighing mechanism through a predetermined path; a plurality of electric conductors; a platform on which the same are mounted; a source of electric energy in circuit with the tracks; load-discharging means connected with the source of electric energy; and a circuit-controller on the scale-beam, having a series of prongs.

35. The combination, with a carrier and with driving mechanism for operating said carrier, of weighing mechanism mounted on the carrier and including a load-discharger; overloading means; means involving a plurality of solenoids for actuating the load-discharger; and instrumentalities for successively energizing the solenoids at predetermined points in the travel of the carrier.

36. The combination, with a carrier and with mechanism for imparting a traveling movement thereto, of a scale-beam mounted upon the carrier; a load-receiver having a closer and supported by the scale-beam; overloading means for the load-receiver; a plurality of solenoids mounted on the load-receiver; closer-actuating means coöperating, respectively, with the solenoids and the closer; and means for successively energizing the solenoids at predetermined points in the travel of the carrier.

37. The combination of weighing mechanism embodying a load-receiver; a closer; a plurality of solenoids mounted on the load-receiver; gearing coöperative, respectively, with the solenoids and the closer; and means for successively energizing the solenoids.

38. The combination of a load-receiver; a supporting scale-beam therefor; a closer on the load-receiver, supported for oscillation and having its axis on a line passing through the center of the load-receiver; a plurality of solenoids; means situated between the solenoids and the closer for causing the operation of the latter; and instrumentalities for successively energizing the solenoids.

39. The combination of weighing mechanism embodying a load-discharger supported for oscillation in opposite directions; a plurality of solenoids; means situated between the solenoids and the load-discharger for operating the latter; and instrumentalities for successively energizing the solenoids.

40. The combination of a load-receiver having a closer; a supporting scale-beam for the load-receiver; overloading means embodying a valve; a solenoid adapted to hold the valve open; a plurality of closer-actuating solenoids; means for successively energizing the several solenoids; and circuit-breaking means operative, respectively, with the valve and closer.

41. The combination of a load-receiver having a closer; a supporting scale-beam for the load-receiver; a plurality of solenoids coöperative, respectively, with the valve and the closer; means for successively energizing the several solenoids; and circuit-breaking means coöperative, respectively, with the valve, the scale-beam, and the closer.

42. The combination of weighing mechanism; overloading and load-reducing means successively effective during the weighing of a load; a surplus-receiving hopper having a plurality of channels in its lower end; and a base having a coöperating series of channels.

43. The combination of weighing mechanism embodying a load-receiver; overloading and load-reducing means successively effective during the weighing of a load; a carrier for the weighing mechanism; a base; a mast stepped in the base, having in its lower end a chamber; a surplus-receiving hopper supported by the mast and having in its lower end a series of channels; and a coöperating series of channels leading into openings formed in the mast.

FRANCIS H. RICHARDS.

Witnesses:
F. N. CHASE,
HEATH SUTHERLAND.